(12) United States Patent
Chae

(10) Patent No.: US 10,568,057 B2
(45) Date of Patent: Feb. 18, 2020

(54) METHOD FOR PERFORMING RANGING RELATED OPERATION IN WIRELESS COMMUNICATION SYSTEM

(71) Applicant: LG ELECTRONICS INC., Seoul (KR)

(72) Inventor: Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/563,530

(22) PCT Filed: Apr. 1, 2016

(86) PCT No.: PCT/KR2016/003406
§ 371 (c)(1),
(2) Date: Sep. 29, 2017

(87) PCT Pub. No.: WO2016/159716
PCT Pub. Date: Oct. 6, 2016

(65) Prior Publication Data
US 2018/0098299 A1      Apr. 5, 2018

Related U.S. Application Data

(60) Provisional application No. 62/141,841, filed on Apr. 1, 2015, provisional application No. 62/204,430, filed
(Continued)

(51) Int. Cl.
H04W 56/00 (2009.01)
H04W 76/14 (2018.01)
(Continued)

(52) U.S. Cl.
CPC ....... *H04W 56/0065* (2013.01); *H04W 8/005* (2013.01); *H04W 64/003* (2013.01); *H04W 76/14* (2018.02); *H04W 72/0446* (2013.01)

(58) Field of Classification Search
CPC ... H04J 11/00; H04W 56/00; H04W 56/0065; H04W 64/003; H04W 72/0446; H04W 76/14; H04W 8/005
See application file for complete search history.

(56) References Cited

U.S. PATENT DOCUMENTS

| | | | | |
|---|---|---|---|---|
| 2013/0316727 | A1* | 11/2013 | Edge | H04W 4/02 455/456.1 |
| 2014/0370904 | A1* | 12/2014 | Smith | H04W 8/005 455/450 |

(Continued)

FOREIGN PATENT DOCUMENTS

| | | |
|---|---|---|
| WO | 2012106798 | 8/2012 |
| WO | 2013162333 | 10/2013 |

(Continued)

OTHER PUBLICATIONS

PCT International Application No. PCT/KR2016/003406, Written Opinion of the International Searching Authority dated Jul. 25, 2016, 21 pages.

(Continued)

*Primary Examiner* — Khaled M Kassim
(74) *Attorney, Agent, or Firm* — Lee Hong Degerman Kang & Waimey

(57) ABSTRACT

One embodiment of the present invention relates to a method by which a user equipment (UE) performs ranging in a wireless communication system, comprising the steps of: transmitting a D2D signal in a subframe N by a first UE; receiving the D2D signal in a subframe N+K from a second UE, which has set, as a subframe boundary, a time point at which the D2D signal is received; and measuring, by the first UE, a round trip time (RTT) by detecting a reception time point of the D2D signal transmitted by the second UE.

10 Claims, 11 Drawing Sheets

Related U.S. Application Data on Aug. 12, 2015, provisional application No. 62/251,669, filed on Nov. 5, 2015.

(51) Int. Cl.
*H04W 8/00* (2009.01)
*H04W 64/00* (2009.01)
*H04W 72/04* (2009.01)

(56) References Cited

U.S. PATENT DOCUMENTS

| | | | | |
|---|---|---|---|---|
| 2015/0092689 | A1* | 4/2015 | Ko | H04L 1/1861 370/329 |
| 2015/0296365 | A1* | 10/2015 | Choi | H04W 56/00 370/336 |
| 2016/0044704 | A1* | 2/2016 | Li | H04W 4/70 370/330 |
| 2017/0099599 | A1* | 4/2017 | Ko | H04W 76/14 |
| 2018/0063706 | A1* | 3/2018 | Nolan | H04W 8/005 |

FOREIGN PATENT DOCUMENTS

| | | |
|---|---|---|
| WO | 2013165145 | 11/2013 |
| WO | 2013176999 | 11/2013 |
| WO | 2014165386 | 10/2014 |
| WO | 2015023224 | 2/2015 |

OTHER PUBLICATIONS

Intel, "Synchronization Procedure for D2D Communication", 3GPP TSG RAN WG1 Meeting #78bis, R1-143761, Oct. 2014, 5 pages.
European Patent Office Application Serial No. 16773497.9, Search Report dated Oct. 1, 2018, 7 pages.

* cited by examiner

FIG. 5
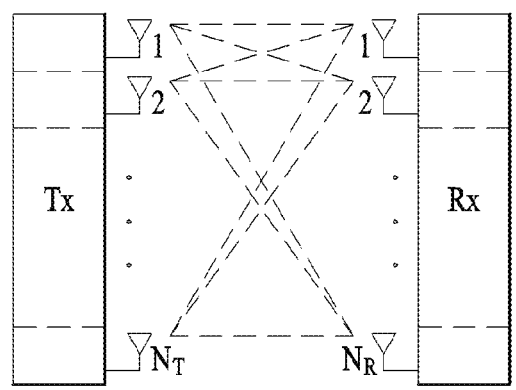
(a)
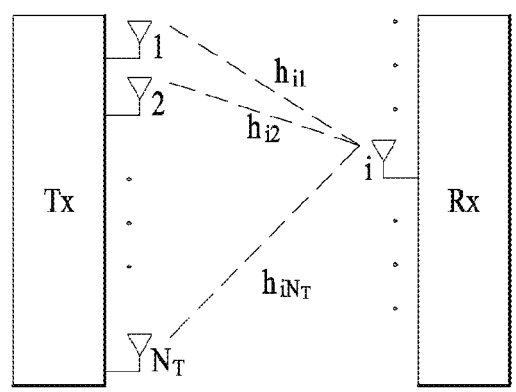
(b)

FIG. 8
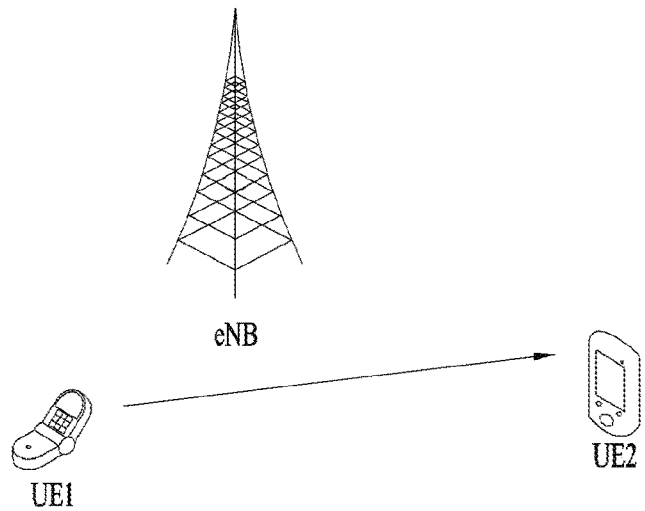
(a)
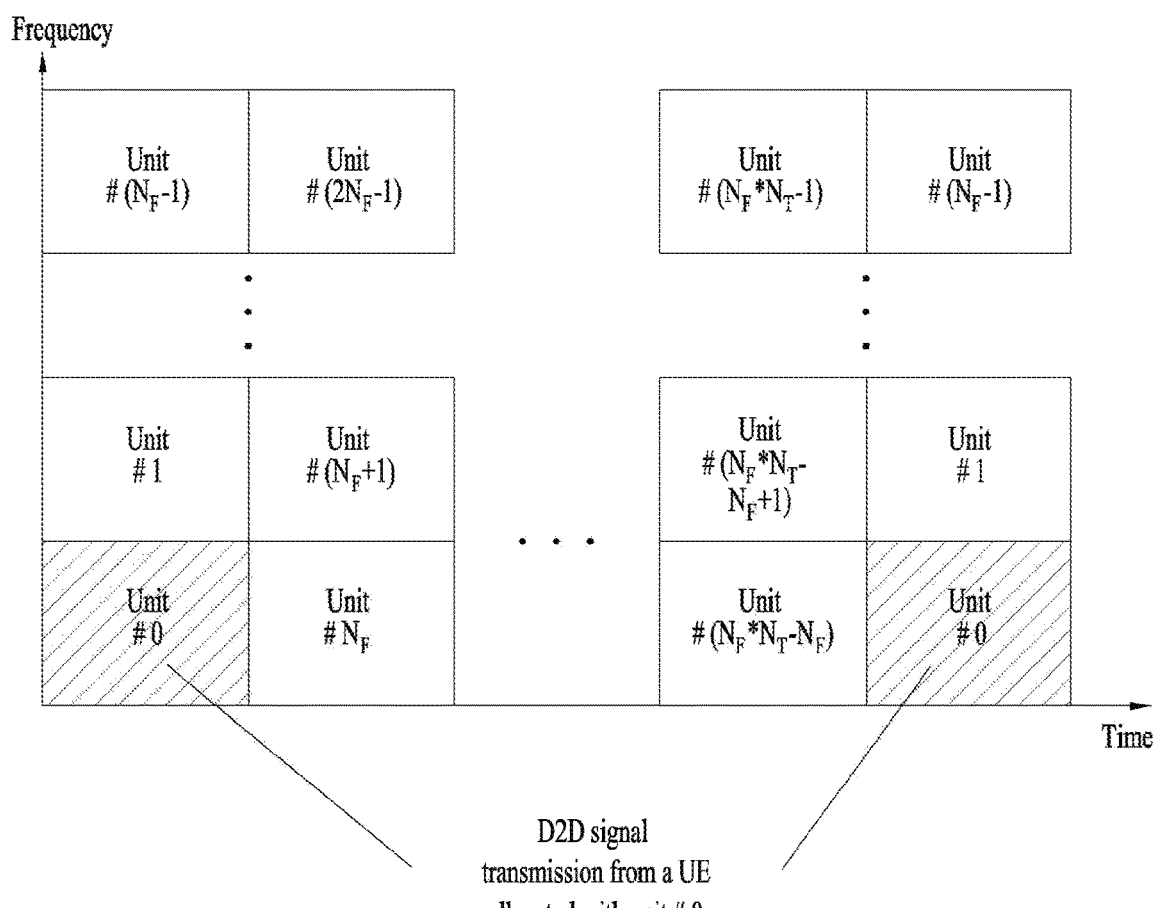
D2D signal transmission from a UE allocated with unit # 0
(b)

METHOD FOR PERFORMING RANGING RELATED OPERATION IN WIRELESS COMMUNICATION SYSTEM

CROSS-REFERENCE TO RELATED APPLICATIONS

This application is the National Stage filing under 35 U.S.C. 371 of International Application No. PCT/KR2016/003406, filed on Apr. 1, 2016, which claims the benefit of U.S. Provisional Application Nos. 62/141,841, filed on Apr. 1, 2015, 62/204,430, filed on Aug. 12, 2015, and 62/251,669, filed on Nov. 5, 2015, the contents of which are all hereby incorporated by reference herein in their entirety.

TECHNICAL FIELD

Following description relates to a wireless communication system, and more particularly, to a method of performing a ranging-related operation of a UE and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

DISCLOSURE OF THE INVENTION

Technical Task

A technical task of the present invention is to provide a method of performing ranging using a D2D signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing ranging, which is performed by a user equipment (UE) in a wireless communication system, includes the steps of transmitting a D2D signal in a subframe N by a first UE, receiving the D2D signal in a subframe N+K from a second UE, which has configured the timing at which the D2D signal is received as a subframe boundary, and measuring RTT (round trip time), by the first UE, by detecting the timing at which the D2D signal transmitted by the second UE is received.

To further achieve these and other advantages and in accordance with the purpose of the present invention, according to a different embodiment, a user equipment (UE) performing ranging in a wireless communication includes a transmitter and a receiver, and a processor, the processor configured to transmit a D2D signal in a subframe N, the processor configured to receive the D2D signal in a subframe N+K from a second UE, which has configured the timing at which the D2D signal is received as a subframe boundary, the processor configured to measure RTT (round trip time) by detecting the timing at which the D2D signal transmitted by the second UE is received.

The RTT can be obtained by dividing a difference between the timing at which the D2D signal transmitted by the second UE is received and a start point of the N+K subframe by electromagnetic wave speed.

The D2D signal transmitted by the first UE in the subframe N may correspond to one selected from the group consisting of a discovery signal, a D2D communication signal, and an SSS (sidelink synchronization signal).

At least one of the N and the K can be configured by a network.

The K may correspond to a value configured by a network and if the subframe N+K is not a D2D subframe, the K may correspond to a D2D subframe closest to the subframe N+K.

The D2D signal transmitted by the second UE can include location information of the first UE.

The location information of the first UE can include at least one selected from the group consisting of latitude, longitude, and height.

Advantageous Effects

According to the present invention, it is able to perform ranging while minimizing interference due to transmission and reception of a signal of a different D2D UE or a cellular signal.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incor

FIG. 5 is a diagram for a configuration of a wireless communication system having multiple antennas;

FIG. 8 is a diagram for an example of a D2D resource pool for performing D2D communication;

BEST MODE

Mode for Invention

Figure 1:
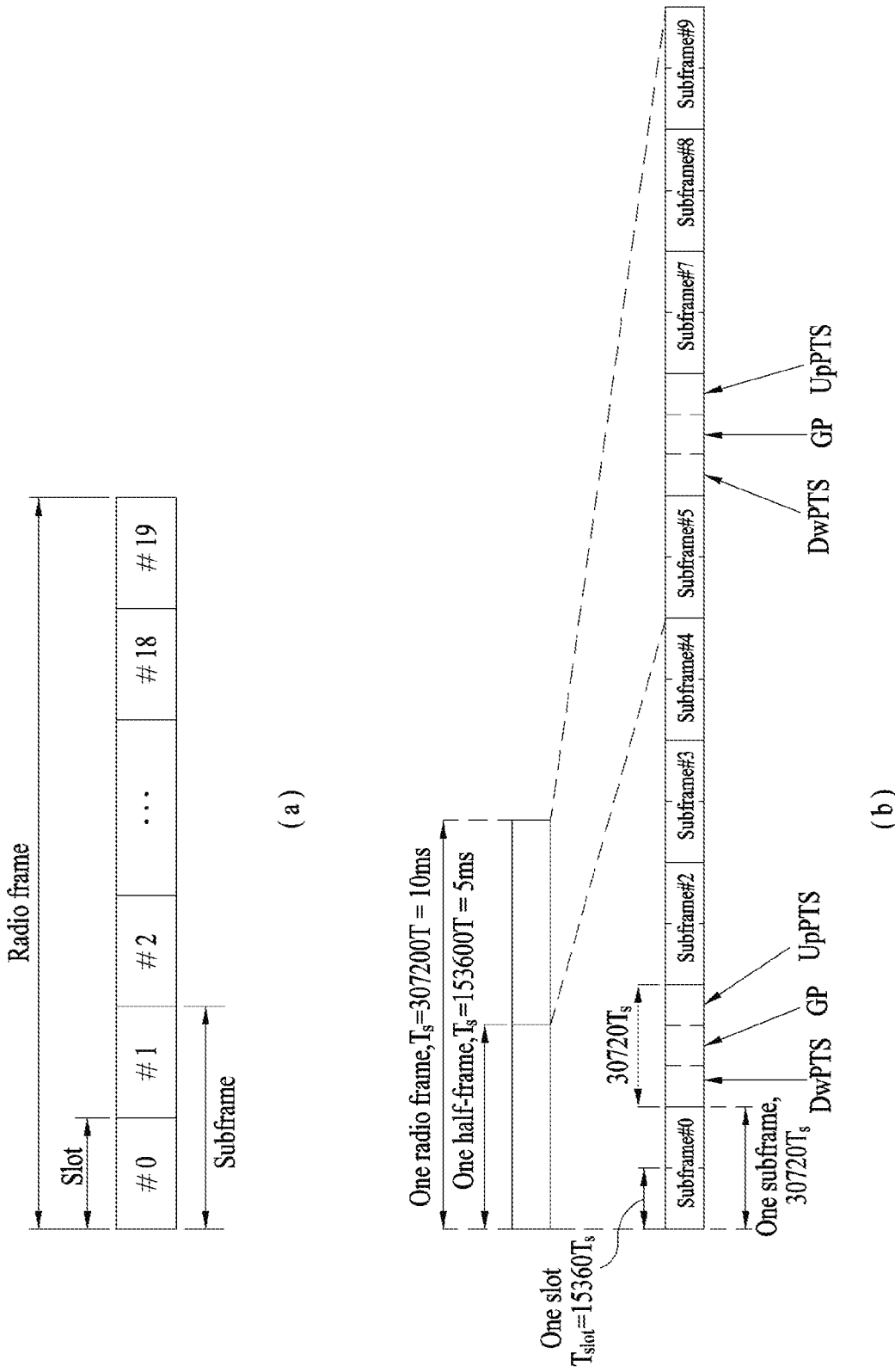
- FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
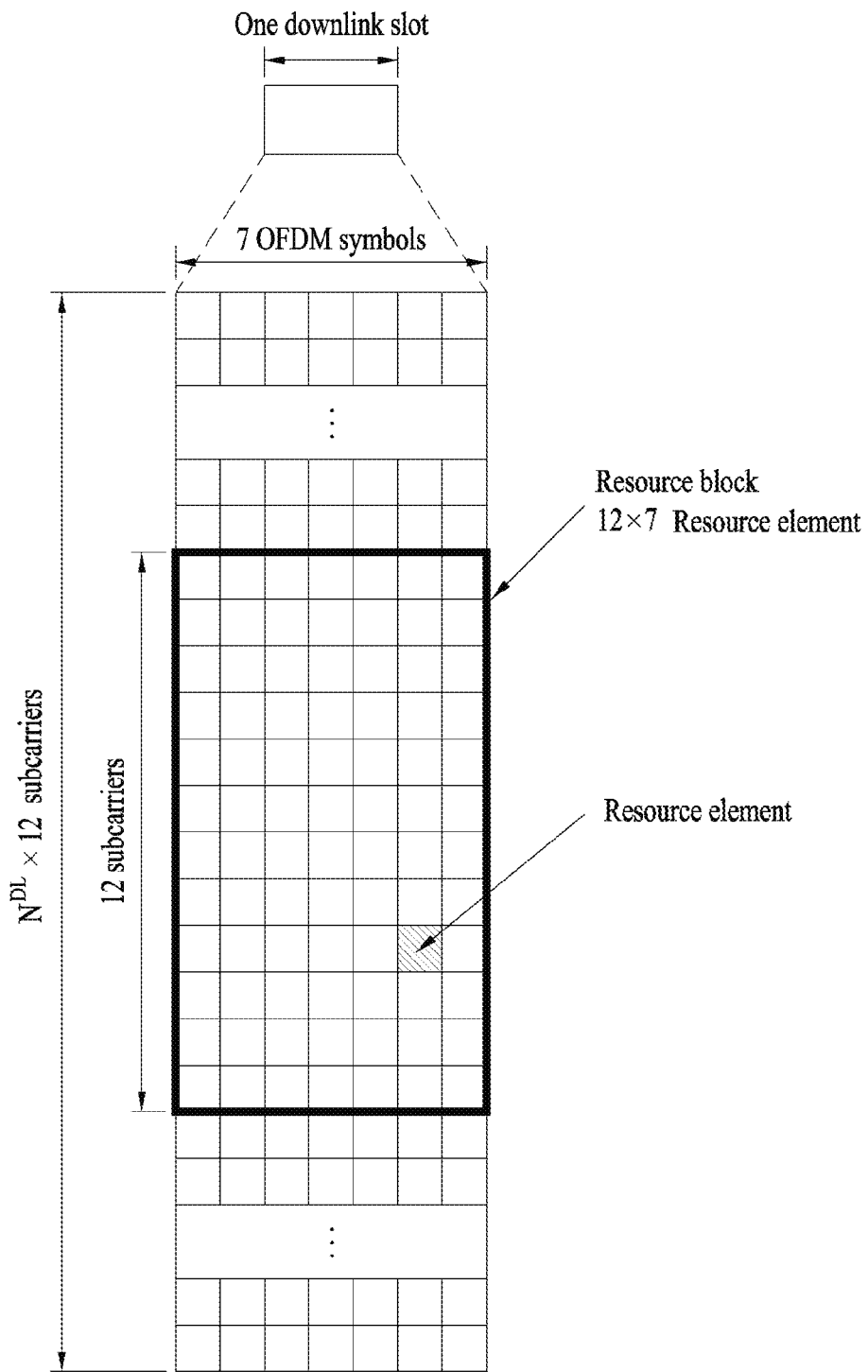
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
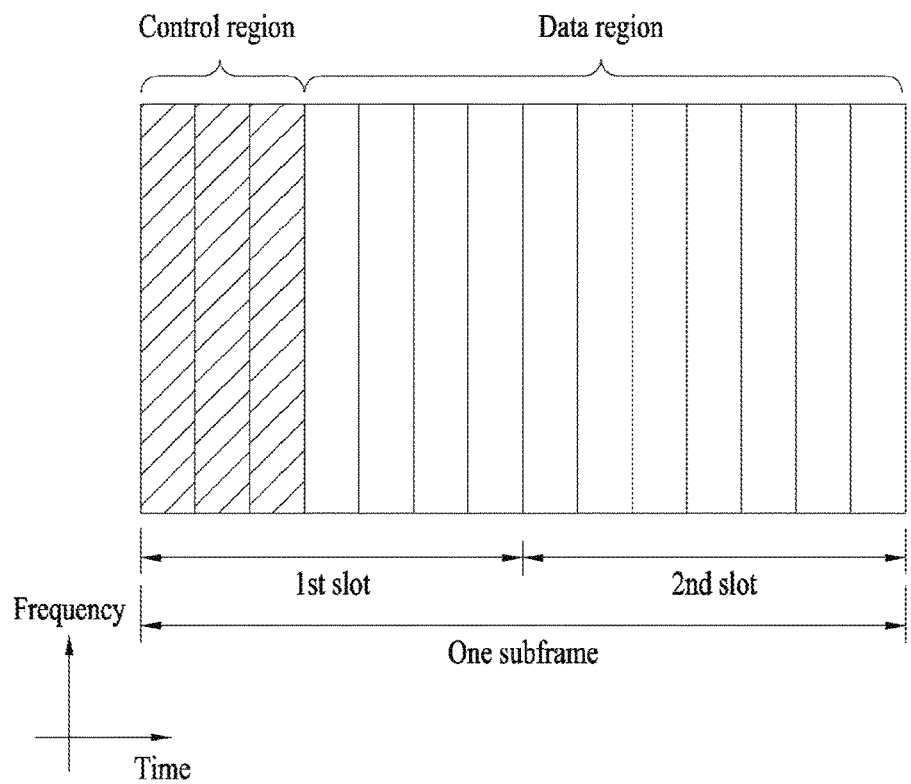
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
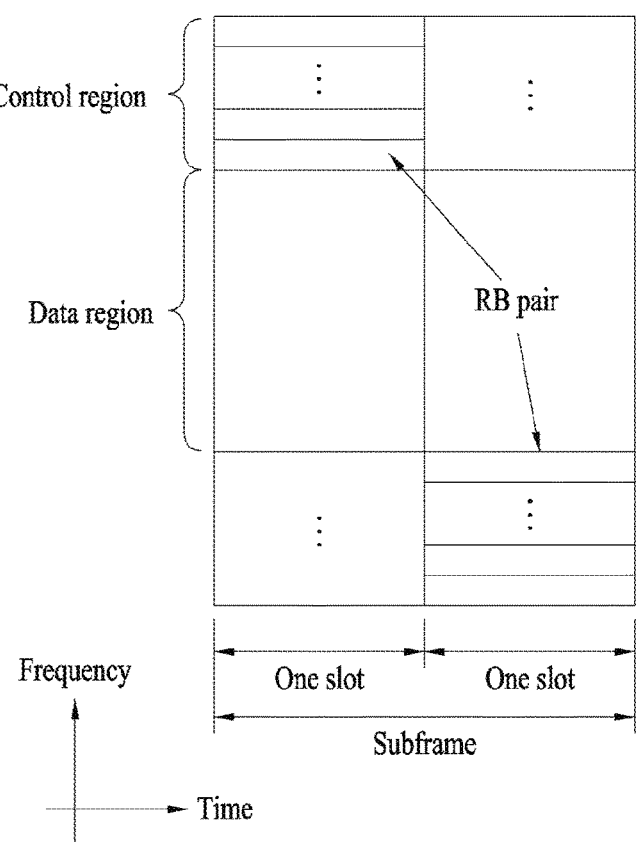
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_t} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}]$$  [Equation 7]

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$  [Equation 8]

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{N_R}]^T$$  [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$  [Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank (H) of the channel matrix H is restricted as follows.

$$\text{rank}(H) \leq \min(N_T, N_R)$$  [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
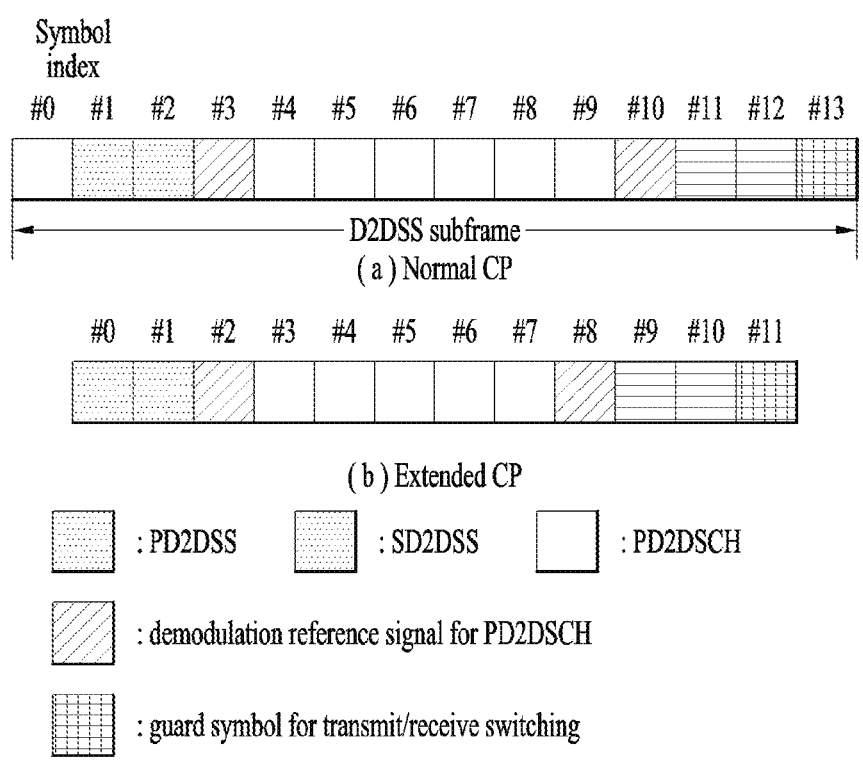
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
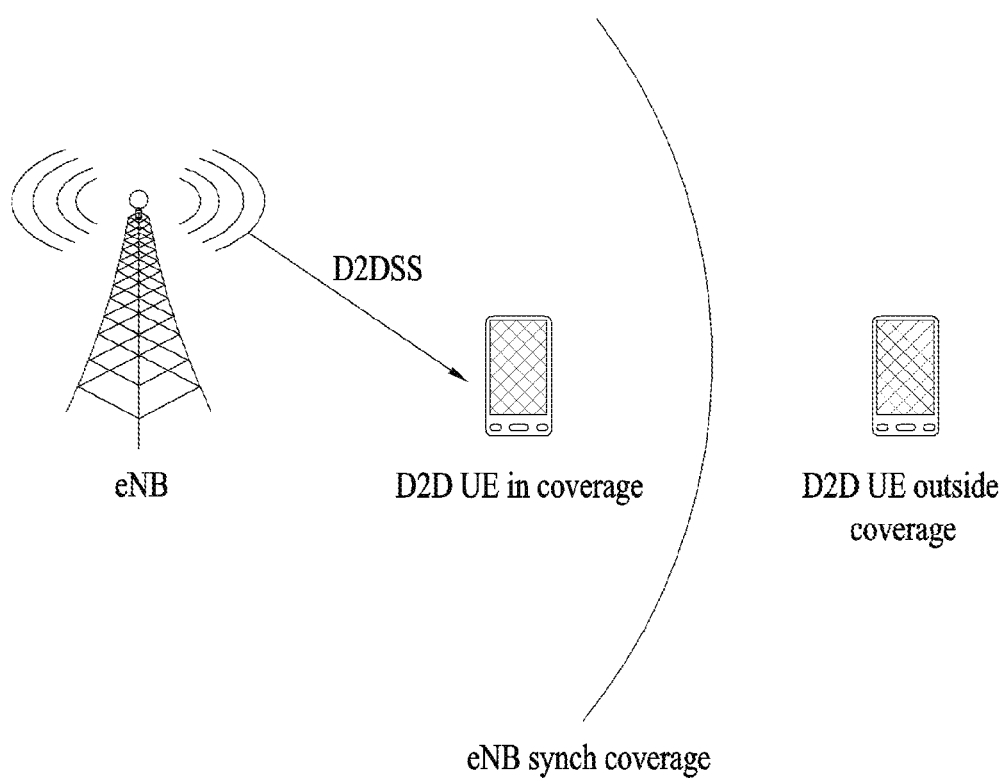
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
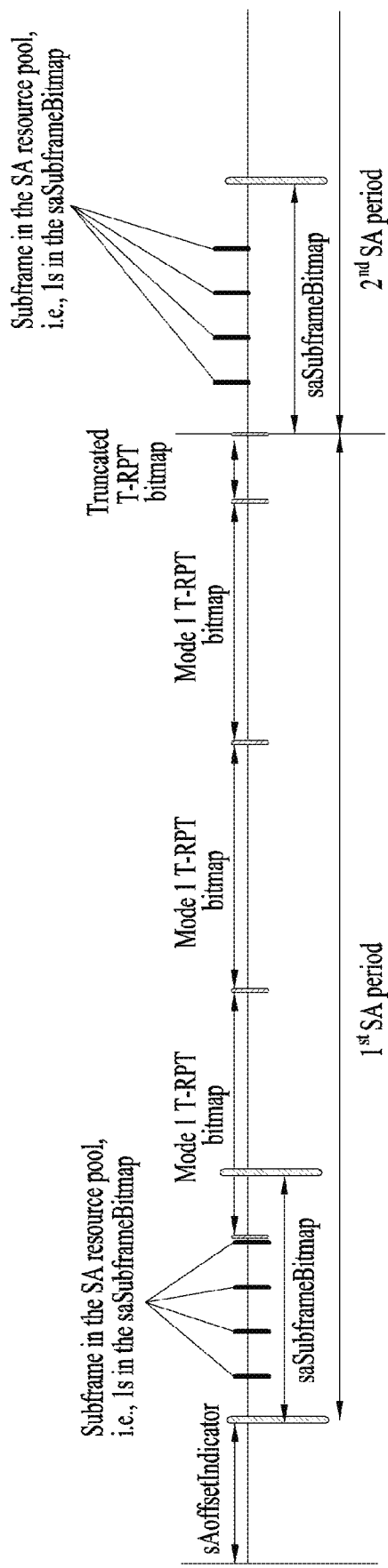
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

In the following, a method of performing ranging and positioning by directly transceiving a signal between D2D UEs is explained based on the aforementioned description. In legacy WiFi, it may use immediate acknowledgement to measure RTT. In this case, the RTT can be measured by measuring timing of transmitting unicast data, which is transmitted to an AP by an STA (mobile device), and timing of receiving ACK. Or, the RTT can be measured by measuring timing of transmitting RTS (request to send) and receiving CTS (clear to send). However, since a network may turn off the RTS/CTS in WiFi network, it is impossible to measure the RTT using the RTS/CTS in the network. It is difficult to use the ranging scheme of WiFi in cellular communication as it is. In a cellular communication, similar to WiFi, if a specific UE immediately transmits ACK to perform ranging, it may generate ICI to a different UE, thereby causing serious performance degradation. In the following, embodiments for a method of performing ranging while minimizing ICI are explained.

Embodiment 1

Figure 10:
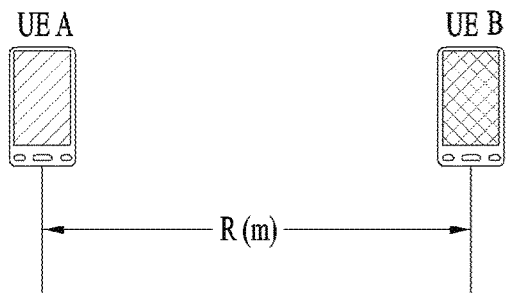
FIGS. 10 to 12 are diagrams for explaining various embodiments of the present invention.

As shown in FIG. 10, an embodiment 1 relates to a method of estimating a distance and measuring RTT when a first UE (UE A) and a second UE (UE B) are apart from each other as much as R meters.

The first UE can transmit a D2D signal in a subframe N. Subsequently, the second UE configures the timing at which the D2D signal is received as a subframe boundary and receives the D2D signal in a subframe N+K. In this case, the K may correspond to a predetermined value or a value signaled by a network. The first UE detects the timing at which the D2D signal transmitted by the second UE is received and measures RTT (round trip time). In particular, among the two D2D capable UEs, the UE A transmits a D2D signal and the UE B configures the timing at which the signal of the UE A is received as a subframe boundary. Subsequently, the UE B transmits a D2D signal in a promised subframe. The UE A detects signal reception timing of the UE B in a promised subframe and measures RTT (round trip time) to perform ranging. In this case, the RTT can be obtained by dividing a difference between the timing at which the D2D signal transmitted by the second UE is received and a start point of the N+K subframe by electromagnetic wave speed.

The D2D signal transmitted by the first UE in the subframe N may correspond to one selected from the group consisting of a discovery signal, a D2D communication signal, and an SLSS (sidelink synchronization signal). For example, if the first UE transmit an SLSS for ranging, the second UE configures the timing at which the SLSS is received as a subframe boundary and transmits a signal. In particular, not the DL timing but the SLSS reception timing is configured as a subframe boundary in the in-coverage to transmit a signal.

In the foregoing description, although it is explained as a signal transmitted by the first UE corresponds to a D2D signal, the signal transmitted by the first UE may correspond to one of legacy UL signals rather than the D2D signal. In particular, the signal transmitted by the first UE may have a sequence form such as a DMRS and an SRS. Or, the signal may have a data packet form such as PUSCH and a sidelink discovery/communication (shared) channel.

Similar to the signal transmitted by the first UE, a response signal transmitted by the second UE may correspond to one of legacy UL signals. Or, the response signal may correspond to a sidelink (e.g., D2D) signal. If the response signal transmitted by the second UE corresponds to a UL signal, the signal may have a sequence form such as a DMRS or an SRS. Or, the signal may have a data packet form such as PUSCH. If the response signal transmitted by the second UE corresponds to a sidelink signal, the signal may correspond to an SLSS (sidelink synchronization signal), a discovery signal, or a signal of a form similar to a D2D communication signal. The (D2D) signal transmitted by the second UE can include location information of the first UE. The location information of the first UE can include at least one selected from the group consisting of latitude, longitude, and height. By doing so, the first UE is able to know an approximate radius of an absolute location of the second UE at the time of measuring RTT. The location information can be separately transmitted by the second UE in a ranging procedure.

In the embodiment 1, if the first UE transmits a signal to the second UE, the second UE transmits a signal on the basis of the signal received from the first UE. In particular, since the first UE estimates timing of a return signal on the basis of the transmission timing of the UE A, transmission of a first signal can be performed at any timing. For example, the first UE can transmit a D2D signal using DL timing or UL timing. In this case, the UE B can transmit a response signal in a promised subframe in response to the D2D signal of the UE A on the basis of the timing at which the D2D signal is detected.

Figure 11:
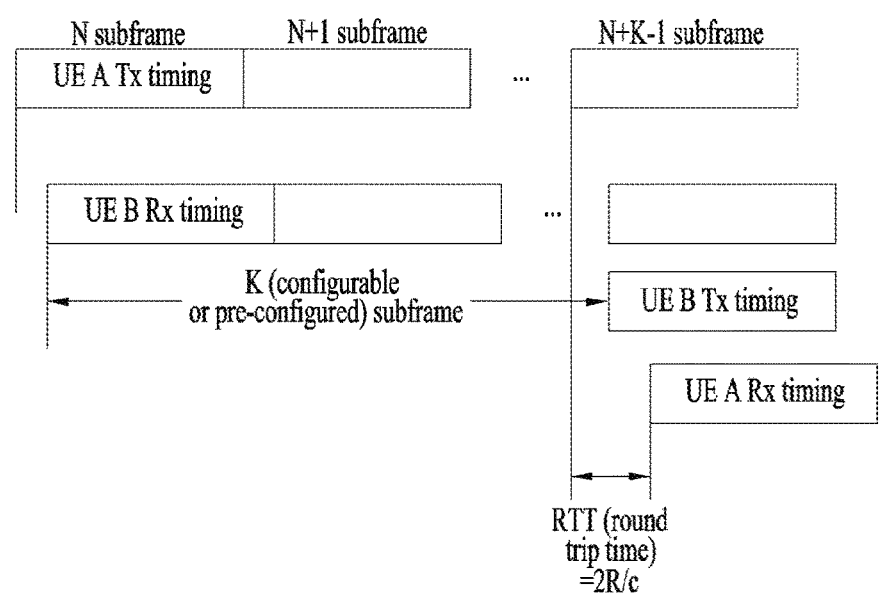

In relation to N and K, FIG. 11 shows signal transmission between a first UE (UE A) and a second UE (UE B) and RTT measurement. In this case, the N and the K may correspond to predetermined values or values configured by a network. For example, the N and the K can be configured (to a UE transmitting and receiving a ranging signal by a network via physical layer signaling or higher layer signaling) using a separate resource for performing sidelink ranging (between UEs) or can be configured by predetermine values. In this case, one of the N and the K is configured by a network and another one can be configured by a predetermined value. For example, the K can be configured by 4 corresponding to a predetermined value. Or, it may be able to determine a rule that the K is transmitted in a closest subframe included in a D2D resource while the K is equal to or greater than a (a corresponds to a predetermined value or a value capable of being configured by a network). In particular, when the K corresponds to a value configured by a network if a subframe N+K is not a D2D subframe, the subframe N+K may correspond to a D2D subframe closest to the subframe N+K. Or, the K can be determined in advance from among values equal to or greater than a and equal to or less than b. Or, the K can be signaled by a network. The reason why the upper limit b is configured is, if the second UE transmits a response signal after too much time is elapsed from the timing at which a signal of the first UE is received, to prevent a wrong RTT from being estimated due to the position change of the second UE and/or the first UE.

For example, when a signal for D2D ranging is transmitted, it may be able to allocate a resource associated with discovery. X number of subframes, which appear after the resource associated with the discovery, can be configured or preconfigured by a network for D2D ranging. A sidelink resource related to the ranging can be configured by a network via physical layer signaling or higher layer signaling. Or, (if all or a part of UEs are located at out-of-coverage) a predetermined resource may transmit and receive a signal for performing ranging. Or, a UE intending to perform ranging may signal a position of a resource used for the ranging to a ranging signal receiving UE via a D2D control signal in advance. Or, a UE, which has firstly transmitted a ranging signal, performs ranging on a reception UE using a corresponding packet and can indicate the reception UE to transmit feedback on the ranging signal in a specific resource.

Embodiment 2

Embodiment 2 relates to a case that transmission timing of a ranging signal transmitted by the first UE is configured by third timing instead of DL timing or PUSCH timing of an eNB.

In this case, the third timing may correspond to a median value between the DL timing and the UL timing, the timing to which offset is applied from the DL timing as much as TA/2, or global timing such as GPS, and the like. In this case, 624 Ts offset can be additionally applied to perform Tx/Rx switching in TDD. In other word, it can be represented as a signal is transmitted using DL Tx timing of an eNB. In the following, it is referred to as DL Tx timing. In this case, all UEs align transmission timing to the DL transmission timing to transmit a signal and the second UE (a UE receiving a ranging signal) detects the timing at which a signal of the first UE is received from a median value between the DL timing and the UL timing of the second UE or TA/2 timing to estimate propagation delay between the UEs. According to the present method, since it is not necessary for the second UE to transmit a response signal, it is efficient in terms of resource utilization.

Figure 12:
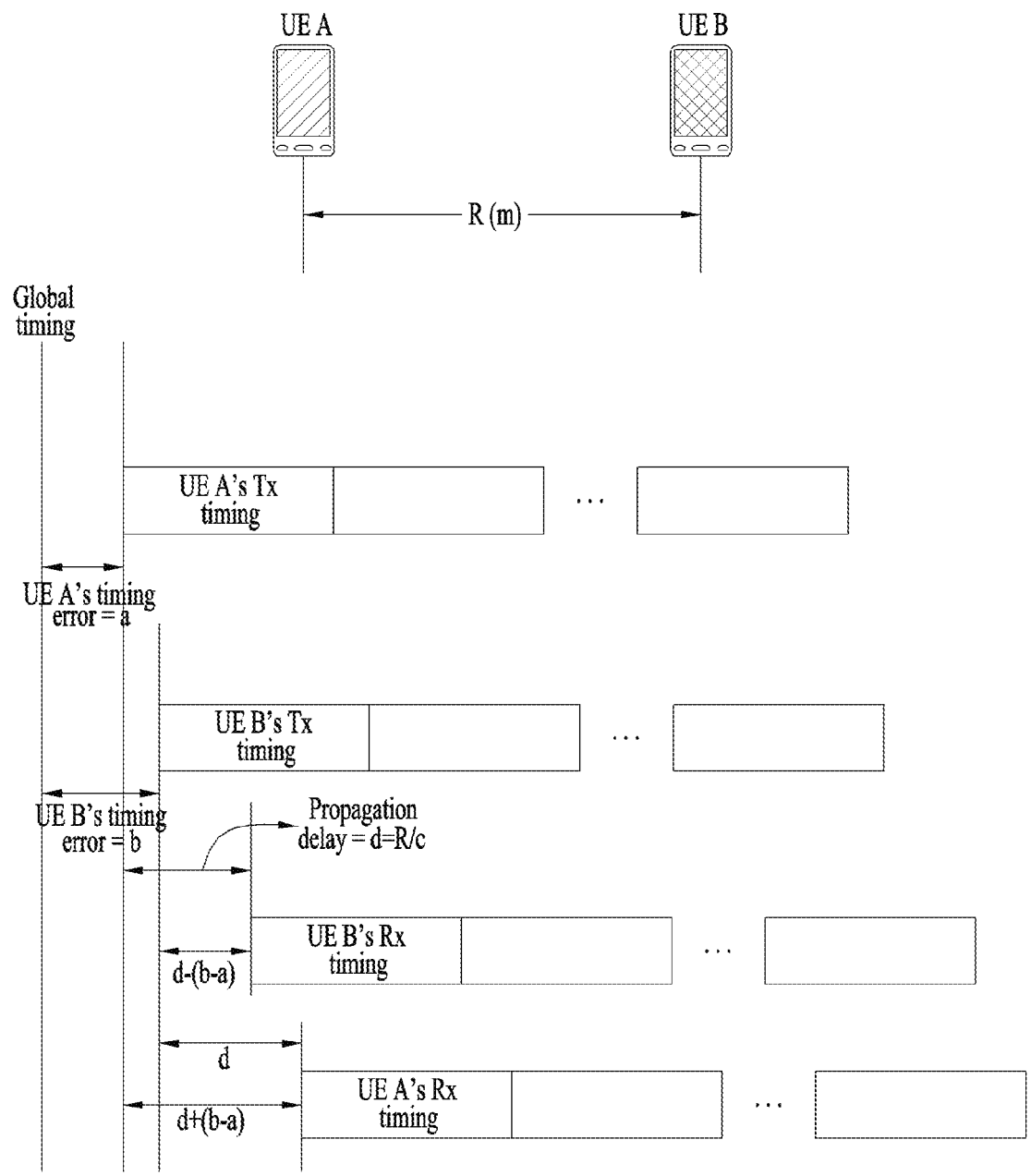

FIG. 12 illustrates a case that the third timing corresponds to global timing. In particular, if the first UE and the second UE receive a GPS signal, the UE A and the UE B may have a common timing clock. Hence, the first UE and the second UE can transmit a signal on the basis of the same timing. In this case, if a clock of each UE drifts or absolute time information has an error, each UE may have a different error. In case of performing ranging, if there is a timing measurement error of a very small value, it may cause a huge error in estimating a location. Hence, it is necessary to revise an error as much as possible. For example, referring to FIG. 12, assume that the first UE has an error as much as a and the second UE B has an absolute time reference error or GPS timing error as much as b. In this case, if the first UE receives a signal from the second UE, the first UE measures d+(b−a). If the second UE receives a signal from the first UE, the second UE B measures d−(b−a). In this case, d corresponds to propagation delay between the first UE and the second UE. In this case, if the first UE and the second UE estimate mutual propagation delay and signal a measurement value of the estimated propagation delay with each other via a discovery signal or a communication signal, each of the UEs averages a measurement value of its own and a measurement vale of another UE to estimate accurate propagation delay.

To this end, a UE can signal a measurement value of propagation delay received from another UE and all or a part of information capable of indicating an ID of a UE discovered by the UE or another UE to another UE via a D2D signal. A UE averages a measurement value of the UE and a measurement value of another UE to reduce a clock error between the two UEs. Referring to FIG. 12, the first UE measures d+(b−a) and signals the measured value to the second UE. The second UE measures d−(b−a) and signals the measured value to the first UE. Each of the UEs averages the value measured by itself and the measured value received from the partner UE to calculate accurate propagation delay.

In order to perform the abovementioned operation, an eNB may indicate a D2D signal or a UL signal transmitted by the first UE for ranging and a location of a transmission resource via a dedicated signal. Or, each of the UEs may select a transmission resource from a resource region allocated for a plurality of UE groups and transmit a signal for ranging measurement. Or, a resource for a signal transmitted by a specific UE or a UE group can be configured or a preconfigured by a network.

The second UE can transmit the estimated propagation delay, RTT, a distance between the two UEs, or information of a different form capable of inducing a value equivalent to the distance to the first UE via physical layer signaling or higher layer signaling. Similarly, the first UE measures a signal transmitted by the second UE at the DL TX timing and estimates a distance between the two UEs.

Meanwhile, in case of transmitting a ranging signal using DL timing, UL timing, or DL Tx timing only from a specific eNB, since it is difficult to listen to a signal of the specific eNB, a considerable error may occur. In this case, in order to reduce the error, it may be able to configure the timing at which a ranging signal is transmitted using an average value of the DL/UL or DL Tx timing.

In this case, it may be able to determine a rule that timing averaging is performed only when strength of a signal received from an eNB is equal to or greater than a prescribed threshold value. A threshold value, which is used for determining signal strength from an eNB participating in timing configuration, may correspond to a predetermined value or a value configured by a network.

When the proposed ranging signal is transmitted and received, since the signal is transmitted using separate timing different from timing of a legacy D2D signal (UL or DL timing), it may be able to determine a rule that the ranging signal is transmitted in a separate resource pool different from a signal of different timing. The resource pool can be configured by a network via physical layer signaling or higher layer signaling. (In case of out-coverage, it may use a preconfigured resource).

A resource for transmitting and receiving a ranging signal (i.e., a resource transmitting/receiving a signal at third timing rather than UL/DL timing) can be transmitted with a period similar to a period of discovery. When a network configures a discovery resource pool, it may be able to determine a rule that additional signaling is to be performed or transmission is to be performed in a predetermined part of the discovery resource pool.

A resource for measuring reception timing of a ranging signal or a signal of another UE can be transmitted in a form of 'scheduling assignment+data'. In this case, SA can perform transmission and reception by configuring an SA format or an SA ID to perform ranging or positioning rather than D2D communication. In this case, when the SA format is differently configured, it may indicate that a field configuration of SA is different and a physical format of SA is different. In this case, a predetermined sequence or a signal of 'sequence+codeword' form is transmitted in a data region to make UEs performing ranging transceive a signal with each other. For example, a UE intending to perform ranging can transmit the SA. In this case, an ID included in the SA may correspond to an ID capable of being recognized by a reception UE in advance. The data region can be divided into a resource region where a UE, which has transmitted the SA, performs transmission and a resource region where a UE, which has received the SA, performs transmission. For example, in T-RPT (time resource pattern for transmission) of a transmission UE, the transmission UE transmits a signal for performing ranging or positioning at a position of even-numbered 1 and a reception UE can transmit a signal for performing ranging or positioning at a position of odd-numbered 1. Or, a resource pool where the transmission UE and the reception UE or the UE A and the UE B performing ranging transmit a signal for performing ranging or positioning can be configured by a network or can be divided in advance. Hence, a signal can be transmitted and received in the resource pool.

In the aforementioned 'SA+data' structure, timing of transmitting the SA may be different from timing of transmitting data. For example, the SA is transmitted using DL timing and the data can be transmitted by one of the proposed timing configuration methods (timing at which a signal is received from another UE, timing configured on the basis of timing information received from a third device (e.g., GPS), or timing (DL Tx timing) to which offset is applied as much as TA/2 from DL (Rx) timing). In this case, an offset value between the SA transmitting timing and the data transmitting timing can be transmitted by one of contents of the SA.

Meanwhile, a BW on which a signal for performing ranging or positioning is transmitted can be determined in advance or can be configured by a network. In order to estimate accurate timing, it is preferable to transmit the signal on wideband if possible. To this end, narrowband transmission (transmission less than 6RBs) can be excluded from signal transmission BWs in a signaling method. Or, it may be able to determine a rule that transmission should be performed by RBs equal to or greater than NRBs (N corresponds to a predetermined value or a value configured by a network). In some cases, a transmission UE may select a signal from among signals equal to or greater than 6RBs and equal to or less than 100RBs and indicate a BW via SA.

A sequence for performing ranging or positioning may have a form similar to a form of a DMRS, PSS/SSS, SLSS (PSSS/SSSS), or a modified form.

When a data region is used for measuring timing only, it may transmit the data region in a manner of emptying the data region or filling the data region with RSs (i.e., RSs are transmitted at a position at which a codeword was previously transmitted). Or, RS is transmitted at a legacy RS transmission position only and data RE can be transmitted in a manner of being emptied out. Or, an RS for performing timing/positioning can be transmitted to the last symbol of a subframe not used by legacy D2D UEs. In this case, all or a part of symbols of a next subframe can be punctured or can be configured as a guard region. Or, when a signal for performing ranging is transmitted to the last symbol and the signal uses the third timing (e.g., GPS timing), if a D2D signal uses DL timing, a symbol boundary of the D2D signal can be overlapped with a symbol boundary of the ranging signal. In order to prevent the overlap, it may be able to transmit a ranging signal of a partial symbol length. For example, a symbol of a length corresponding to the half of a legacy symbol can be transmitted in the last symbol region of a D2D subframe. In particular, it may be able to prevent the overlap between the symbol boundary of the D2D signal and the symbol boundary of the ranging signal using a ranging signal of a short length.

Meanwhile, all or a part of the methods of performing ranging/positioning between D2D UEs can also be used for performing ranging between an eNB and a UE and performing time align between UEs. In particular, in FIG. 10, a UE may become an eNB and the eNB can signal location information of the eNB to a UE via physical layer signaling or higher layer signaling to perform ranging between the eNB and the UE. If a UE corresponds to a UE equipped with a GPS or a UE capable of recognizing a location of the UE using a different position estimation scheme, the UE compares the location of the UE with a location of an eNB to determine a distance between the UE and the eNB. In this case, the UE is able to estimate transmission timing of the eNB using reception timing of a signal transmitted by the eNB. When the UE is aware of transmission timing information of the eNB, the UE aligns transmission timing of a signal with the transmission timing information of the eNB to transmit a specific signal. By doing so, it may be able to easily perform ranging/positioning or D2D communication between UEs. Or, if a UE or an eNB transmits location information of the UE or the eNB to neighboring UE via physical layer signaling or higher layer signaling, a reception UE may use the location information to determine a beamforming direction. For example, if a first device transmits location information of the first device, a second device receives the location information, identifies a location of the second device and a location of the first device, and may be able to perform beamforming to a direction heading to the first device. In particular, in case of performing mmwave, it is very important to find out a correct beam direction via an initial beam search procedure. If there is no location information, beams are transmitted in all directions to find out an optimized beam direction. If location information is used, since a specific direction is searched first, it may have a merit in that it is able to considerably reduce the initial beam search procedure and time. To this end, a UE or an eNB may separately configure a resource for transmitting location information of the UE or the eNB. The UE or the eNB periodically or aperiodically transmits the location information in a predetermined resource or a resource configured by a network.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 13:
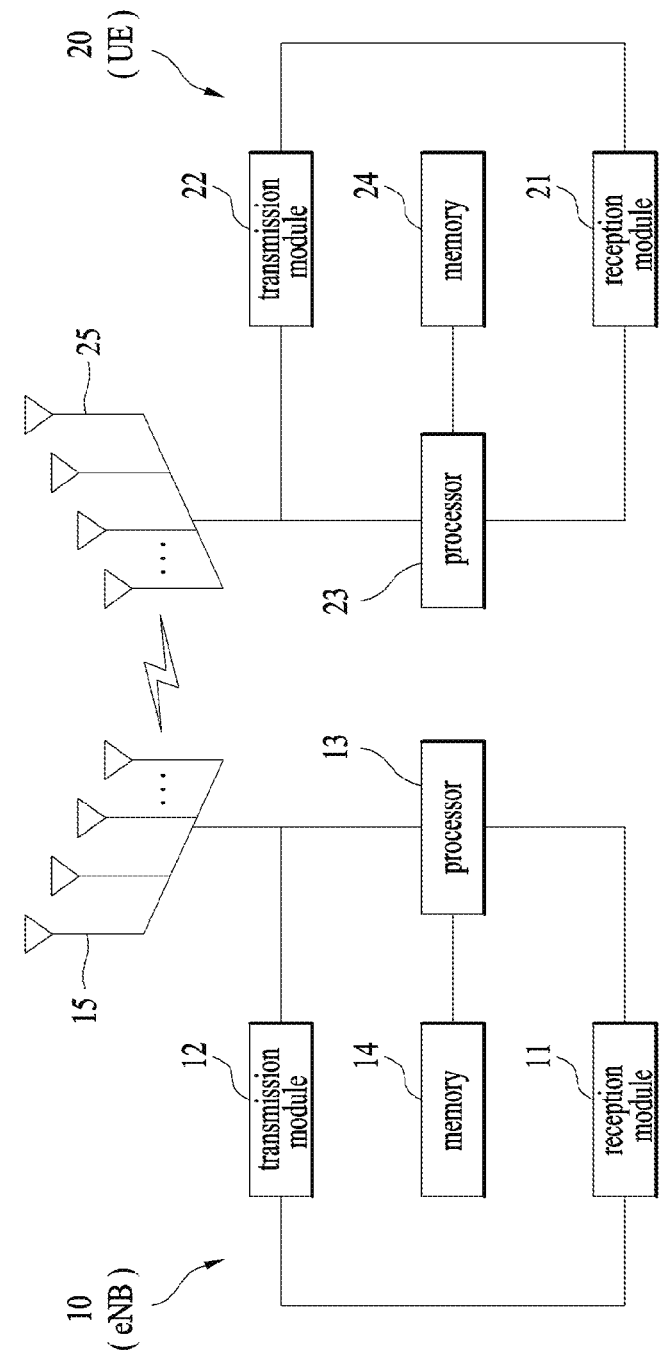
FIG. 13 is a diagram for configurations of a transmitter and a receiver.

FIG. 13 is a diagram for configurations of a transmitter and a receiver.

Referring to FIG. 13, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 13, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 13 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of performing ranging, which is performed by a first user equipment (UE) in a wireless communication system, comprising:
   transmitting a D2D discovery signal in a subframe N by the first UE;
   receiving a D2D signal in a subframe N+K from a second UE; and
   measuring RTT (round trip time), by the first UE, by detecting timing at which the D2D signal transmitted by the second UE is received,
   wherein the subframe N+K in which the D2D signal is received has a subframe boundary configured based on a reception timing at the second UE of the D2D discovery signal; and
   wherein the K corresponds to a value configured by a network and wherein if the subframe N+K is not a D2D subframe, the K corresponds to a D2D subframe closest to the subframe N+K.

2. The method of claim 1, wherein the RTT is obtained by dividing a difference between the timing at which the D2D signal transmitted by the second UE is received and a start point of the subframe N+K subframe by electromagnetic wave speed.

3. The method of claim 1, wherein at least one of the N and the K is configured by a network.

4. The method of claim 1, wherein the D2D signal transmitted by the second UE comprises location information of the first UE.

5. The method of claim 4, wherein the location information of the first UE comprises at least one selected from the group consisting of latitude, longitude, and height.

6. A user equipment (UE) for performing ranging in a wireless communication system, comprising:
   a transmitter and a receiver; and
   a processor coupled to the transmitter and receiver, wherein the processor is configured to;
   transmit a D2D discovery signal in a subframe N,
   receive a D2D signal in a subframe N+K from a second UE,
   measure RTT (round trip time) by detecting timing at which the D2D signal transmitted by the second UE is received,
   wherein the subframe N+K in which the D2D signal is received has a subframe boundary configured based on a reception timing at the second UE of the D2D discovery signal; and
   wherein the K corresponds to a value configured by a network and wherein if the subframe N+K is not a D2D subframe, the K corresponds to a D2D subframe closest to the subframe N+K.

7. The UE of claim 6, wherein the RTT is obtained by dividing a difference between the timing at which the D2D signal transmitted by the second UE is received and a start point of the subframe N+K subframe by electromagnetic wave speed.

8. The UE of claim 6, wherein at least one of the N and the K is configured by a network.

9. The UE of claim 6, wherein the D2D signal transmitted by the second UE comprises location information of the first UE.

10. The UE of claim 9, wherein the location information of the first UE comprises at least one selected from the group consisting of latitude, longitude, and height.

* * * * *